United States Patent
Brennan

(10) Patent No.: US 6,537,481 B2
(45) Date of Patent: Mar. 25, 2003

(54) HYBRID METHOD FOR FIRING OF CERAMICS

(75) Inventor: John H. Brennan, Horseheads, NY (US)

(73) Assignee: Corning Incorporated, Corning, NY (US)

(*) Notice: Subject to any disclaimer, the term of this patent is extended or adjusted under 35 U.S.C. 154(b) by 140 days.

(21) Appl. No.: 09/727,184

(22) Filed: Nov. 30, 2000

(65) Prior Publication Data

US 2001/0006175 A1 Jul. 5, 2001

Related U.S. Application Data

(63) Continuation-in-part of application No. 09/473,864, filed on Dec. 28, 1999, now abandoned.

(51) Int. Cl.[7] .......................... H05B 6/64; G01B 15/00; C04B 33/32
(52) U.S. Cl. ........................ 264/406; 264/432
(58) Field of Search .................. 264/406, 432

(56) References Cited

U.S. PATENT DOCUMENTS

| | | |
|---|---|---|
| 4,771,153 A | 9/1988 | Fukushima et al. |
| 4,963,709 A | 10/1990 | Kimrey, Jr. |
| 5,227,600 A | 7/1993 | Blake et al. |
| 5,266,762 A | 11/1993 | Hoffman et al. |
| 5,365,043 A | 11/1994 | Bradford |

FOREIGN PATENT DOCUMENTS

| | | |
|---|---|---|
| EP | 0 500 252 | 8/1995 |
| GB | 2 262 333 | 6/1993 |
| JP | 6-279127 | 10/1994 |
| WO | 88/04127 | 6/1988 |
| WO | 92/02150 | 2/1992 |
| WO | 93/12629 | 6/1993 |
| WO | 94/20209 | 9/1994 |
| WO | 95/05058 | 2/1995 |
| WO | 97/44170 | 11/1997 |
| WO | 97/44626 | 11/1997 |

OTHER PUBLICATIONS

"Microwave Sintering of Advanced Ceramics", Wroe and Samuels, pp. 39–51.
"Scaling up the Microwave Firing of Ceramics", Wroe, *Microwaves II*, pp. 449–458.
"Microwave–assisted Firing of Ceramics", Wroe and Pearson.
"Microwave–assisted Firing of Ceramics", Wroe, Ch. 1–New Develop. & Applications, pp. 43–53.
"Dual Firing Drying of Ceramics", Maloney and Wroe, ZI 3/97, pp. 141–145.
"Keramischer Brand mit Mikrowellen–Unterstutzung", Wroe and Pearson, pp. D9–D11.
"Evidence of a non–thermal microwave effect in the sintering of partially stabilized zirconia", Wroe and Rowley, *Journal of Materials Science 31* (1996) 2019–2026.

(List continued on next page.)

Primary Examiner—Christopher A. Fiorilla
(74) Attorney, Agent, or Firm—Kees van der Sterre; Timothy M. Schaeberle

(57) ABSTRACT

A ceramic article is fired using a combination of microwave energy and conventional heating energy according to a microwave power-time heating schedule comprising a series of separate firing segments at predetermined microwave power settings, the core and surface temperatures of the article being monitored during firing to determine the core-surface temperature differential, that differential being controlled and limited to prevent cracking of the ceramic article by adjusting the level of applied conventional heat energy during firing.

9 Claims, 1 Drawing Sheet

OTHER PUBLICATIONS

"Microwave-assisted oxygenation of melt-processed bulk $YBa_2Cu_3O_{7-\delta}$ ceramics", Rowley, Wroe, Vazquez-Navarro, Lo, Cardwell, *Journal of Materials Science 32* (1997) 4541–4547.

"Improving Energy Efficiency in Firing of Ceramics", Wroe, Materials World, 8/93, pp. 446–448.

Effects of the time sequence of the cold rolling on the processing time of Ag-alloy sheathed (Bi,Pb)2Sr2Ca2Cu3Ox tapes, M. Penny et al, *Physica C* 262 (1996) 63–67.

"Microwaves: Theory and Application in Materials Processing III", David E. Clark et al., *Ceramic Transactions*, vol. 59, Microwaves III, pp. 68–76.

HYBRID METHOD FOR FIRING OF CERAMICS

This application is a continuation-in-part of application Ser. No. 09/473,864, filed Dec. 28, 1999 now abandoned.

BACKGROUND OF THE INVENTION

1. Field of the Invention

The invention relates to method for manufacturing ceramic materials. In particular, this invention relates to a hybrid method for firing ceramics involving microwave and conventional heating, and more particularly to a method for efficiently controlling the heating rate by separately controlling the proportions of microwave and conventional radiative/convective energy.

2. Discussion of the Related Art

Conventional heating used in the manufacturing of ceramic materials typically comprises radiative gas or electric resistance heating. Utilization of conventional radiative/convective heating typically results in a thermal differential within the ceramic body, due to the fact that radiant heating is applied only to the surface and it relies on thermal conductivity of the ceramic body, typically poor, to effect the temperature beneath the surface and into the interior of the piece. In other words, conventional heating involves heat transfer that is predominantly achieved by radiation or convection to the surface followed by conduction from the surface into the interior of the ceramic body. If a core-surface thermal differential develops that is too great, internal cracking and distortion of the ceramic body can occur. Fast firing further exacerbates this problem of poor heat transfer, and ultimately cracking. Additionally, the presence of a core-surface thermal gradient can also result in uneven sintering, specifically surface sintering prior to, and at a faster rate than, interior sintering. As a result, the ceramic body may exhibit non-uniform properties. Undesirable solutions involve reducing the rate of heating or allowing lengthy holds at certain temperatures. Each of these undesirable solutions allows heat energy to be conducted into the core of the ceramic body, which in turn, allows the temperature of the core of the ceramic body to "catch up" with that of the surface, thereby minimizing the surface/core temperature differential. In summary, the theoretical limits of conventional radiative or convective heating typically result in slow heating rates for all ceramic bodies, the exception being ceramic bodies exhibiting small dimensions.

Microwave heating of ceramics has alternatively been successfully used to fire ceramic bodies. In comparison with conventional heating, microwave heating involves depositing energy directly within the ceramic body and involves a volumetric heating mechanism. Stated differently, the utilization of microwave energy involves delivering a uniform application of the energy to the entire cross section of the ceramic article, rather than to the article surface. Although microwave heating of ceramic bodies is much faster than conventional radiant heating because of this volumetric heating, it, like radiative heating, results in the ceramic body exhibiting a thermal differential; albeit an opposite thermal differential with the core of the ceramic body exhibiting a higher temperature than that of the surface. Specifically, as the ceramic materials, typically poor absorbers of microwave energy at low to intermediate temperatures, are heated with microwaves at high temperatures, the interior of the ceramic body very rapidly begins to absorb substantial amounts of microwave energy; this effect is known as thermal runaway. Although the surface is heated along with the core of the ceramic body, the surface rapidly loses much of its heat energy to the surroundings, typically cooler than the average ceramic material temperature. As the core starts to preferentially absorb the microwave energy this thermal runaway phenomenon becomes self-propagating. Simply stated, as the temperature of the ceramic body increases, the heat losses become greater, and the magnitude of the core-surface thermal differential increases, again leading to thermal stress within, and ultimately cracking of, the ceramic body.

In addition to heat losses from the surface of the ceramic body, non-uniformity of the microwaves within the kiln and non-uniform material properties of the ceramic leading to differential absorption of the microwave energy, contribute to this thermal differential due to microwave heating.

Hybrid microwave/conventional heating or microwave assisted heating has been proposed as an alternative to overcome the problems of conventional radiative and microwave-only heating. In microwave assisted heating involving both microwaves and radiative/convective heating, the volumetric heating provided by the microwaves heats the components, while the conventional heating radiative/convective provided by gas flame or electric resistance heating elements minimizes heat loss from the surface of the components by providing heat to the surface and its surroundings. This combination or hybrid heating can result in heating that avoids thermal profiles associated with conventional and microwave-only firing. As a result, thermal stresses are reduced and or minimized and thus the ceramic bodies can be heated more rapidly.

Typically, control of these microwave assisted firing methods involves placing a thermal measurement device on the surface to control the conventional firing rate and a second thermocouple into the core of the ceramic to control the microwave energy input. Experience with this method of control has revealed that the two control points are in too close of a proximity to each other to be effective and to result in the stable operation of the two control systems. The effects of the conventional firing are often picked up by the internal temperature measurement system, while the surface temperature measurement often registers effects of the microwave energy input. As a result, the two independent control systems become unstable and often result in an operation where one of the energy inputs, microwave or conventional, is manually controlled while the other is controlled automatically, as required, to maintain the desired heating rate or thermal profile; an inefficient control means, at best.

A slight variation on this microwave-assisted ceramic firing standard control method is disclosed in PCT Application WO 95/05058. This reference discloses a method of independently controlling the quantities of heat generated in the ceramic body by the microwave energy and radiant heat by measuring the ambient temperature within an enclosure containing the ceramic body. Based on, and in response to, this ambient temperature measurement, the heat generated in the ceramic body is controlled by one or both of the microwave energy or radiant heat. Although this control method is an improvement of the conventional control method, the mixing of kiln gases may not be uniform enough to accurately predict the ceramic body surface temperatures, thus reducing the effectiveness of the method. Further, many of the chemical reactions that occur within the ceramic body take place at temperatures low enough that radiant heat transfer is not a primary means of heat transfer from the ceramic body to the inside surfaces of the kiln where the kiln ambient temperatures are measured.

SUMMARY OF THE INVENTION

Accordingly it is an object of this invention to provide a method of, efficiently and effectively controlling the microwave and conventional radiative/convective energy utilized in the heating of ceramics that overcomes the shortcomings of the aforementioned hybrid microwave energy-conventional heating of ceramics.

The firing method of present invention comprises placing a ceramic article in a microwave heating apparatus having a microwave cavity and subjecting the ceramic material to an amount of heat energy by irradiating it with electromagnetic microwave radiation. The microwave power to which the ceramic is subject to is varied over time according to a predetermined microwave power-time or temperature-time profile. This predetermined microwave power-time or temperature-time profile includes periods of constant power output, periods where the power is ramped from a low output to a higher output, and periods where the power output is ramped from a high output to a lower output. Additionally, one embodiment of the method involves continuously measuring the ceramic article's core and surface temperatures and adjusting the amount of conventional radiative/convective heat in response to the difference between the two measured temperatures. The conventional heat is adjusted to a level such that the surface temperature is caused to be at a temperature whereby the thermal differential between the surface temperature and the core temperature is maintained at an acceptable level. The firing of the ceramic article utilizing both microwave power and the conventional heat is continued until that hold temperature at which the ceramic article is typically held for a period of time to complete the sintering of the article, the so-called sintering soak or hold temperature.

DETAILED DESCRIPTION OF THE INVENTION

Figure 1:
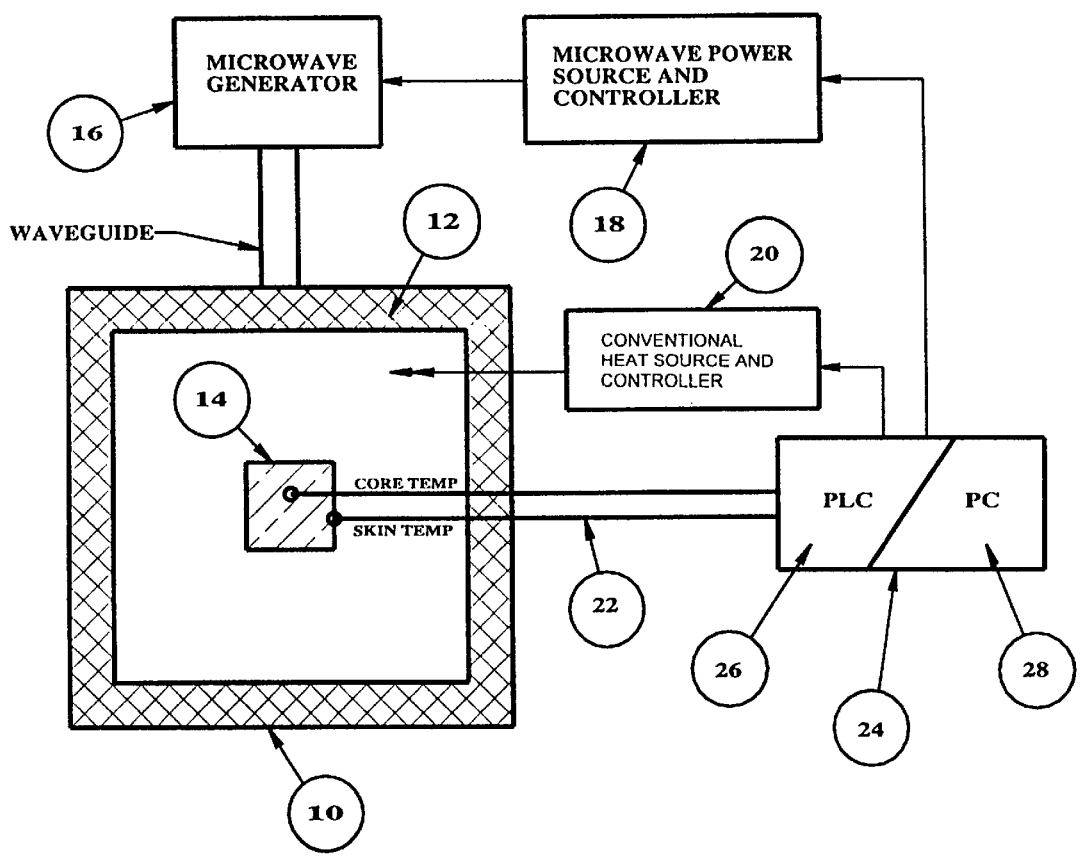
FIG. 1 is a block diagram of an apparatus illustrating the basic system for sintering a ceramic article according the inventive firing method described herein.

Referring to FIG. 1, shown is a basic system for heating ceramic materials according to the method described herein. This system comprises a microwave resonant cavity 10, comprising a thermally insulated wall 12, within which is located a ceramic article 14 to be sintered. A microwave generator 16, for example a magnetron, is coupled directly or indirectly to the cavity 10; a waveguide is one means for coupling the microwave energy. The system includes a microwave power source/controller 18 for continuously adjusting the microwave power and an independently controlled conventional heat source/controller 21, configured to deliver conventional heat within the thermally insulated enclosure 12 is shown. It is contemplated that the conventional heat source can comprise, convective or radiative heat, including, but not limited to, conventional electric resistance or gas heating in either a direct or indirect burner configuration.

The resonant cavity may be multimodal, namely it will support a large number of resonant modes in a given frequency range, and may include a mode stirrer to provide greater uniformity of electric field distribution within the microwave heating chamber.

The generator source employed to generate the microwaves can comprise any conventional magnetron with an adjustable power feature. Preferably, the frequency of incident microwave used should be between the range of about 915 MHz and 2.45 GHz, which is the designated industrial band in the United States. In other countries, wavelengths up to 10,000 MHz are known to be utilized. Furthermore, the power of the incident microwave need be no greater than that sufficient to raise the temperature of the ceramic article to a temperature effective for heating of the ceramic article. Specifically, the microwave generator should possess variable power levels ranging up to 75 kW.

A temperature measurement system 22 capable of measuring both the ceramic article's surface temperature and the temperature proximate the center of the ceramic article, i.e., the core temperature, is coupled to a control unit 24, that independently controls the microwave power source/controller 18 and the conventional heat source/controller 20. This control unit preferably comprises a combination of a programmable logic controller (PLC) 26 and a personal computer (PC 28). The temperature measurement system 22 comprises any appropriate temperature sensors (not shown) capable of measuring both surface and core temperature of the ceramic article. The term core as used throughout refers the interior portion of the ceramic article at or near the center of the particular ceramic article, however the core temperature can be measured at any position in the interior of the ceramic article to accurately reflects the temperature of the core. Suitable sensors include, for example, a pyrometer (or other thermographic device), a sheathed thermocouple, light pipe or black body probe. In a preferred embodiment the sensors comprise sheathed thermocouples comprised of a forwardly extending temperature probe in the form of a type S, or type B, thermocouple housed in a grounded platinum or other high temperature sheath.

In operation the ceramic material is subjected to an amount of heat energy by irradiating it with electromagnetic microwave radiation; this microwave power delivered, and to which the ceramic article is subject to, is varied over time according to a predetermined microwave power-time profile. The power according to this profile is determined so as to heat the ceramic article to its sintering soak temperature in the minimum time while still allowing for the production of a ceramic article that, following the subsequent hold at the sintering soak temperature, exhibits the required characteristics of the ceramic material, specifically, a crack-free, undistorted ceramic article. The predetermined microwave power-time profile is programmed into the control system which manages the power output and resultant microwave delivery to the ceramic article The predetermined microwave power-time profile is variable from material to material and geometry to geometry, and as such it is dependent upon the specific type of ceramic material to be fired; each profile may include periods of constant power output, as well as periods of increasing and decreasing microwave power input. Specifically, this predetermined microwave power-time profile includes periods of constant power output, periods where the power is ramped from a low output to a higher output, and periods where the power output is ramped from a high output to a lower output. Each ceramic material exhibits a firing scheme that is comprised of these various different periods of power output, those periods typically characterized by the following heating events, including, binder burnout, exothermic and endothermic reactions, and shrinkage and expansion. Each of these periods requires different levels of microwave power input, some constant and some variable, so as to avoid any sudden increases or decreases in the temperature in the interior of the ceramic article. Furthermore, material characteristics, such as dielectric and microwave absorption properties, affect the amount of microwave power that is effective to fire the ceramic material. As such, it is necessary for a skilled artisan to empirically determine the actual power-time profile that should be effective and utilized for each type of ceramic article.

Independent control of the conventional heat output source occurs simultaneous with the microwave output. Control of the conventional heat involves measuring both the temperature of the core of ceramic body and, as well as the surface temperature. The control unit compares the surface temperature with that of the ceramic article core and, if a difference is present, an output signal is fed to the conventional heat source resulting in an adjustment in the amount of the conventional heat delivered to the thermally insulated enclosure. Specifically, if the temperature of the surface is less than that of the core, the conventional heat is increased to maintain a surface temperature whereby an acceptable thermal differential is maintained between the surface and core temperatures. An acceptable thermal differential is one that results in a fired ceramic product that is substantially crack and distortion free. In other words, it is contemplated that the method of control could be designed, specifically the PLC, to provide for an condition where there is a slight offset between the surface and the core temperatures. The acceptable thermal differential varies from ceramic material to ceramic material and is additionally a function of the ceramic article shape. In a preferred embodiment this thermal differential is effectively zero, and as such the surface temperature is continually adjusted so that it is nearly equivalent to that of the measured core temperature.

The ultimate effect of the controlling and adjusting of the conventional heat is that the heat generated by the conventional heat source substantially balances out that surface heat lost by the ceramic article. In other words, this control mechanism provides a firing situation wherein the volumetric ceramic article and its surroundings are in thermal equilibrium. As such, there is a minimal core-surface thermal differential and, in turn a minimization of the thermal stresses within the ceramic article. Furthermore, an additional advantage of this method is the use of only one control variable, the conventional heat source, as opposed to the conventional methods of control for microwave assisted firing in which both the microwave power and the conventional heat source are control variables. The latter has resulted in severe control instabilities in some cases.

Although the preferred method of operating the aforementioned method involves irradiating the ceramic article with electromagnetic microwave radiation according to a predetermined microwave power-time profile, it is contemplated that the utilization of a temperature-time profile would work sufficiently well.

It is within the knowledge of one skilled in the art to develop the specific microwave power-time or temperature-time profile, and thus the amount of microwave radiation necessary to heat the article to its sintering or soak temperature within a reasonable amount of time. Factors including the ceramic composition, geometry of the ceramic body, and capabilities of the kiln should be considered in setting up the parameters of the firing process. Specifically those parameters such as the power-time or temperature-time profile, as well as, the acceptable thermal differential sufficient to achieve a reasonable firing cycle that results in a sintered, crack and distortion-free ceramic article. For example, the firing cycle, including the necessary sintering soak, for a cylindrical thin-wall cellular ceramic body exhibiting a 7 in. length, a diameter of 3.866 in. and possessing a 2.0 mil cell wall thickness and 900 cell/in$^2$ and comprising a predominantly cordierite phase involves subjecting the ceramic article to microwave radiation delivered from a microwave assisted kiln with power capabilities ranging between 35 and 60 kW, and frequency of 915 MHz in combination with the requisite amount of gas or electric in order to maintain the core-skin thermal equilibrium, for a period not to exceed 75 hours.

In commercial operation, continuous operation of the inventive method involving continuous control of the conventional heat utilizing the step of measuring both the temperature of the core of ceramic body and, as well as the surface temperature would not be practical. As such, the commercial embodiment of the method would simply involve placing the ceramic body in a heating apparatus comprising a thermally insulated, conventionally heatable microwave-heating cavity. The commercial embodiment would involve heating the body to an elevated core temperature and an elevated surface temperature by subjecting it to a combination of conventional and microwave heat energy. The amount of conventional heat energy to which the body is subjected would be regulated to raise the surface temperature of the body at a rate such that difference between the elevated core and surface temperatures does not exceed the aforementioned predetermined acceptable temperature differential.

Detailed in TABLE I is a typical microwave power-time profile, comprising a series of separate firing periods or segments, for firing a cordierite ceramic material to its sintering soak temperature (1400° C.). This profile would be suitable for a kiln having a microwave power range as listed above and exhibiting approximately 1 m$^3$ load space and loaded with approximately 450 lbs. extruded cellular bodies. In operation, the PLC will perform the following functions during the firing of the ceramic body: (1) setting the microwave power to the preset level for the start of each segment and identifying the preset microwave power level and core target temperature for the end of the segment and coupled, with the target time for each segment, determining the appropriate target microwave-power ramp over each segment; (2) monitoring the core temperature throughout each segment to determine if the target segment time needs to be adjusted or the microwave power endpoint needs to be adjusted, based on the actual core temperature; (3) constant monitoring of the ceramic article's core temperature throughout each segment, with that temperature value measured, in turn, becoming the basis for the calculation of the setpoint temperature to which the conventional heat source heats the surface of the ceramic; (4) calculating the actual surface temperature setpoint utilizing the basis and a predetermined acceptable thermal differential (core temperature vs. surface temperature); (5) adjusting the conventional heat to a level sufficient to heat the surface to the calculated.

TABLE I

| Segment | Starting Temp. | Ending Temp. | Target Time (minutes) | Event | MW Power (kW) at End of Segment |
|---|---|---|---|---|---|
| 1 | 30 | 50 | 9 | Transition | 42 |
| 2 | 50 | 225 | 76 | Normal Heating | 42 |
| 3 | 225 | 250 | 11 | Transition | 12 |
| 4 | 250 | 435 | 80 | Binder Burnout | 15 |
| 5 | 435 | 465 | 13 | Transition | 36 |
| 6 | 465 | 600 | 59 | Chem. Bound Water Loss | 36 |
| 7 | 600 | 650 | 22 | Transition | 45 |
| 8 | 650 | 825 | 76 | Normal Heating | 45 |
| 9 | 825 | 850 | 11 | Transition | 39 |
| 10 | 850 | 1000 | 65 | Chem. Bound Water Loss | 39 |
| 11 | 1000 | 1225 | 98 | Normal Heating | 42 |
| 12 | 1225 | 1250 | 50 | Transition | 24 |
| 13 | 1250 | 1375 | 250 | Property Formation | 18 |
| 14 | 1375 | 1400 | 50 | Transition to Soak | 0 |

The method described herein is particularly suitable for use in the firing thin-wall cellular ceramic bodies as well as thick cross section ceramic articles. Firing as used herein refers to a process of heating a ceramic article to a temperature to densify (sinter) a given ceramic and/or to complete the conversion into the desired crystalline phase.

It should be understood that while the present invention has been described in detail with respect to certain illustrative and specific embodiments thereof, it should not be considered limited to such. For instance, although the inventive control method is described in terms of microwaves, it is contemplated that this method of control is suitable for use with other high frequency wavelengths, e.g., millimeter waves. It is contemplated that numerous modifications are possible without departing from the broad spirit and scope of the present invention as defined in the appended claims.

I claim:

1. In the method of firing a ceramic article comprising heating the article in a microwave heating apparatus to a sintering soak temperature using a combination of microwave heating power and conventional radiative/convective heat energy to reduce the temperature differential between a surface temperature and a core temperature of the ceramic article, the improvement wherein:

the ceramic article is subjected to microwave heating power from an adjustable microwave power generator in a series of separate firing segments including multiple firing segments of constant microwave power output, microwave power that is ramped from a low output to a higher output, and/or microwave power that is ramped from a high output to a lower output;

the surface temperature and the core temperature of the ceramic article are continuously measured; and the temperature differential between the surface temperature and the core temperature of the ceramic article is reduced by adjusting the amount of conventional radiative/convective heat energy supplied during firing to control the surface temperature of the article.

2. The method of claim 1 wherein the temperature differential is reduced to a value effective to prevent cracking or distortion of the ceramic article.

3. The method of claim 1 wherein the temperature differential is essentially zero.

4. The method of claim 1 wherein the combination of microwave heating power and conventional radiative/convective heat energy results in the complete sintering of the ceramic article.

5. The method of claim 1 wherein adjustable microwave power generator generates a maximum power greater than about 1 kW but less than about 75 kW.

6. The method of claim 1 wherein the microwave heating power is delivered at a microwave frequency between 915 MHz and 2.45 GHz.

7. The method of claim 1 wherein the radiative/convective heat energy is from a source selected from the group of electric resistance heating, direct gas burner heating, and indirect gas burner heating.

8. In the method of firing a ceramic article comprising heating the article in a microwave heating apparatus to a sintering soak temperature using a combination of microwave heating power and conventional radiative/convective heat energy to reduce the temperature differential between a surface temperature and a core temperature of the ceramic article, the improvement wherein:

the ceramic article is subjected to microwave heating power from an adjustable microwave power generator in a series of separate firing segments, each firing segment including a segment target time, a starting temperature and an ending temperature, and each segment being conducted at one of constant microwave power, microwave power ramped from a low output to a higher output, and/or microwave power ramped from a high output to a lower output;

the core temperature of the article is measured during each segment and the segment target time or segment microwave power are adjusted if needed to reach the ending temperature;

the surface temperature of the article is measured during each segment; and the difference between the surface temperature and the core temperature of the ceramic article is reduced by adjusting the amount of conventional radiative/convective heat energy supplied during the segment needed to change the surface temperature of the, article.

9. A method in accordance with claim 8 wherein:

the core temperature of the article is used to calculate a surface temperature setpoint corresponding to a surface temperature providing a temperature differential between the surface and core temperatures that is sufficiently reduced to avoid cracking or distortion of the ceramic article, and the amount of conventional heating is adjusted to control the surface temperature of the article and reach the sufficiently reduced temperature differential.

* * * * *